United States Patent [19]
Coolbaugh et al.

[11] Patent Number: 5,948,861
[45] Date of Patent: *Sep. 7, 1999

[54] STAR-BRANCHED BLOCK ELASTOMERIC COPOLYMERS

[75] Inventors: Thomas S. Coolbaugh; Wan-Li Liu; Frederick C. Loveless, all of Yardley, Pa.; Demetreos N. Matthews, Ewing, N.J.

[73] Assignee: Mobil Oil Corporation, Fairfax, Va.

[ * ] Notice: This patent is subject to a terminal disclaimer.

[21] Appl. No.: 08/916,098

[22] Filed: Aug. 21, 1997

Related U.S. Application Data

[60] Division of application No. 08/633,268, Apr. 16, 1996, Pat. No. 5,663,239, which is a continuation-in-part of application No. 08/443,743, May 18, 1995, abandoned, which is a division of application No. 08/361,072, Dec. 21, 1994, Pat. No. 5,457,161, which is a division of application No. 08/225,681, Apr. 11, 1994, Pat. No. 5,376,722, which is a division of application No. 08/029,507, Mar. 11, 1993, Pat. No. 5,306,780, which is a division of application No. 07/952,127, Sep. 28, 1992, Pat. No. 5,268,427, which is a division of application No. 07/466,233, Jan. 16, 1990, Pat. No. 5,187,236.

[51] Int. Cl.⁶ ................................................. C08F 297/04
[52] U.S. Cl. ............................. 525/88; 525/98; 525/314; 525/940
[58] Field of Search ............................. 525/88, 98, 314, 525/940

[56] References Cited

U.S. PATENT DOCUMENTS

| | | | |
|---|---|---|---|
| 3,577,357 | 5/1971 | Winkler | 525/203 |
| 3,823,109 | 7/1974 | Middlebrook | 524/450 |
| 3,985,826 | 10/1976 | Futamura | 525/314 |
| 4,116,917 | 9/1978 | Eckert | 585/11 |
| 4,134,928 | 1/1979 | Moczygemba | 525/314 |
| 4,162,241 | 7/1979 | Canter et al. | 524/157 |
| 4,413,098 | 11/1983 | Hattori et al. | 525/314 |
| 4,628,072 | 12/1986 | Shiraki et al. | 525/577 |
| 4,657,970 | 4/1987 | Shiraki et al. | 525/92 |
| 4,849,481 | 7/1989 | Rhodes et al. | 525/314 |
| 4,879,349 | 11/1989 | Hoxmeier | 525/332.8 |
| 4,898,914 | 2/1990 | Gergen et al. | 525/314 |
| 4,996,266 | 2/1991 | Bronn et al. | 525/271 |
| 5,159,022 | 10/1992 | Ikematu et al. | 525/314 |
| 5,306,780 | 4/1994 | Coolbaugh et al. | 525/314 |

FOREIGN PATENT DOCUMENTS

| | | |
|---|---|---|
| 0315280 | 5/1989 | European Pat. Off. . |
| 56-127604 | 10/1981 | Japan . |
| 328729 | 7/1989 | Japan . |
| 1433990 | 4/1976 | United Kingdom . |
| 2020670 | 11/1979 | United Kingdom . |

OTHER PUBLICATIONS

Falk, Journal of Polymer Science: Part A–1, vol. 9, 2617–2623 (1971).

Falk, et al.., Die Angewandte Makromelekulare Chemie 21 (1972), 17–23 (No. 286).

Mohajer et al., "Hydrogenated linear block copolymers of butadiene and isoprene: effects of variation of composition and sequence architecture on properties," Polymer, 1982, vol. 23, Sep., 1523–1535.

*Primary Examiner*—Jeffrey C. Mullis
*Attorney, Agent, or Firm*—Lori F. Cuomo; Dennis P. Santini

[57] ABSTRACT

Solid star-branched block copolymers wherein each branch comprises at least two (2) alternating blocks bonded to each other, the free end of each branch being a block of at least one polymerized hydrocarbon conjugated diene (I), e.g. isoprene, containing at least 5 carbon atoms, with at least one carbon atom of each pair of residual double-bonded carbon atoms of polymerized diene (I) units being additionally single-bonded to two carbon atoms, or a copolymer of a least one diene (I) and at least one aryl-substituted olefin, e.g. styrene, the blocks adjacent to said polymerized diene (I) containing blocks constituting at least 50 wt. % of said copolymer and being a polymer of at least one hydrocarbon conjugated diene (B), e.g., 1,3-butadiene, which is different from diene (I) and contains at least four (4) carbons atoms, with each residual double-bonded carbon atom of polymerized conjugated diene (B) units being additionally bonded to a hydrogen atom. After the polymerization is completed, the block copolymer may be selectively hydrogenated, so that each (B) polymer block is hydrogenated to such an extent that it contains substantially none of the original ethylenic unsaturation, while each of the (I) polymer or copolymer blocks retains a sufficient amount of its original ethylenic unsaturation to cure (or vulcanize) the copolymer.

8 Claims, No Drawings

STAR-BRANCHED BLOCK ELASTOMERIC COPOLYMERS

CROSS-REFERENCE TO RELATED APPLICATIONS

This is a divisional of application Ser. No. 08/633,268, now U.S. Pat. No. 5,663,239, filed Apr. 16, 1996, which is a continuation-in-part of application Ser. No. 08/443,743, filed May 18, 1995 which is a divisional of application Ser. No. 08/361,072, filed Dec. 21, 1994 and now U.S. Pat. No. 5,457,161, which is a divisional of application Ser. No. 08/225,681, filed Apr. 11, 1994 and now U.S. Pat. No. 5,376,722, which is a divisional of application Ser. No. 08/029,507, filed Mar. 11, 1993 and now U.S. Pat. No. 5,306,780, which is a divisional of application Ser. No. 07/952,127, filed Sep. 28, 1992 and now U.S. Pat. No. 5,268,427, which is a divisional of application Ser. No. 07/466,233, filed Jan. 16, 1990 and now U.S. Pat. No. 5,187,236. Of the foregoing patents, U.S. Pat. No. 5,306,780 claims solid star-branched block copolymers.

This application is also related by subject matter to application Ser. No. 07/466,135, Filed Jan. 16, 1990, now U.S. Pat. No. 5,149,895 and to application Ser. No. 07/466,136, filed Jan. 16, 1990.

The entire contents of application Ser. No. 07/466,136 are incorporated herein by reference.

BACKGROUND OF THE INVENTION

1. Field of the Invention

This invention is directed to novel star-branched elastomeric block copolymers having unsaturation only on the blocks at the free end, (i.e. the uncoupled end) of each branch. More particularly, the invention is directed to solid elastomeric star-branched block copolymers comprising branches wherein an interior block of each branch is substantially selectively hydrogenated and therefore contains substantially no unsaturated groups, while each of the terminal blocks of each branch contains a sufficient amount of unsaturation for curing the block copolymers.

The invention is additionally directed to chemically modified derivatives of the above star-branched block copolymers.

Crosslinking of the polymers of the invention produces vulcanizates having unusual properties, e.g., high elongation and excellent aging characteristics.

2. Description of Related Art

Elastomers (or rubbers) of either natural or synthetic origin usually require vulcanization for transformation into insoluble, non-deformable high strength elastomeric products. Before vulcanization, rubbers possess inferior properties and low strength which limit their utility.

There are a number of well known methods for achieving the vulcanization, also referred to as crosslinking, of unsaturated elastomers. Such methods include the use of sulfur and accelerators, peroxides, benzoquinone dioxime, certain phenolic resins and similar agents. Any of the above or any other well known vulcanizing techniques may be utilized to crosslink the elastomers of this invention.

The great majority of currently known synthetic elastomers are based on polymers or copolymers of butadiene or isoprene. These polymers, which include cis-polybutadiene, emulsion polybutadiene (EBR), styrene-butadiene copolymer (SBR), butadiene-acrylonitrile copolymer (NBR) and cis-polyisoprene, provide raw materials for the production of a very large volume of rubber goods, such as automotive tires, conveyor belts, adhesives, footwear, sponge and mechanical goods. Because of the high degree of unsaturation inherent in the polymeric backbones, these elastomers are easily and quickly vulcanizable alone or in blends. A secondary consequence of the high degree of backbone unsaturation is the instability of such elastomers in the presence of ozone and oxygen, both of which promote rapid deterioration of these elastomers.

Butyl rubber, which is a copolymer of isobutylene and 2–3% by weight (wt.) of isoprene, represents a class of elastomers far more resistant to oxygen and ozone than those based on butadiene or isoprene. The backbone of butyl rubber is primarily polyisobutylene (which provides a saturated spine) into which there is randomly copolymerized about 2–3% by wt. of isoprene to provide unsaturated sites for vulcanization. Butyl rubber finds limited use because of its relatively poor elastomeric properties, and is used primarily in applications which take advantage of its damping properties, weathering resistance and low gas permeability.

Ethylene-propylene-diene rubber (EPDM) has enjoyed substantial commercial growth as a synthetic rubber since it combines excellent oxidation resistance with good elastomeric properties. This elastomer is prepared by the polymerization of ethylene, propylene and a non-conjugated diene, such as 1,4-hexadiene, dicyclopentadiene or ethylidene norbornene. Diene incorporation is typically 5–10% by weight (wt.). The diene is randomly incorporated into the saturated ethylene-propylene backbone to provide pendant vulcanization sites.

The above prior art elastomers, with either high or low levels of unsaturation, are characterized in that, having random unsaturation, they are randomly crosslinked during vulcanization. The success of vulcanization in incorporating all molecular chains into the final crosslinked network with minimal "loose ends" is termed the degree of network perfection. An imperfect network, wherein crosslinks occur randomly and sometimes not near the end of a molecular chain, produces a vulcanized polymer having poor mechanical and elastomeric properties caused by chain ends which are not a part of the tightly bound network. In order to insure the highest degree of network perfection attainable, randomly unsaturated elastomers must be crosslinked extensively. The large number of crosslinks necessary (25 to 40 per 100,000 molecular weight) dictates that the average distance between crosslinks ($M_c$) must be relatively small in comparison with the dimensions of the whole molecule. Elastomeric properties, such as elongation, depend greatly on $M_c$—the smaller the $M_c$ the worse are the elastomeric properties, e.g., the lower the elongation of the vulcanized polymer.

Various block copolymers having excellent elastomeric properties, especially elongation, have been made in the past. For example, a block copolymer commonly known as KRATON, manufactured by Shell Chemical Company, which has outstanding properties at room temperature, is a thermoplastic elastomer consisting of block segments of polymerized styrene units and polymerized aliphatic diolefin units, such as butadiene or isoprene. The most common structure of KRATON is the linear A-B-A block, such as styrene-butadiene-styrene (S-B-S) or styrene-isoprene-styrene (S-I-S). One of such rubbers is believed to be described by Jones, U.S. Pat. No. 3,431,323. Jones discloses block copolymers containing block segments of polymerized vinyl arene monomer units, e.g., styrene, butadiene monomer units, and vinyl arene units. After the block copolymer is prepared, it may be subjected to hydrogenation to such a degree that the unsaturation of the polybutadiene block is reduced to less than 10% of its original value, while 10–25% of the poly-vinyl arene block segments are hydrogenated. Although the KRATON triblock copolymers have excellent elastomeric properties at room temperature, since they are thermoplastic materials they lose these properties at temperatures of about 80° C. (and higher). In addition, since these polymers are not chemically crosslinked, they are soluble in many organic solvents. These latter two deficiencies place some restrictions on the viable areas of application for these polymers.

Falk, JOURNAL OF POLYMER SCIENCE: PART A-1, Volume 9, 2617–2623 (1971), the entire contents of which are incorporated herein by reference, discloses a method of selectively hydrogenating 1,4-polybutadiene units in the presence of 1,4-polyisoprene units. More particularly, Falk discloses selective hydrogenation of the 1,4-polybutadiene block segment in the block copolymer of 1,4-polybutadiene—1,4-polyisoprene—1,4polybutadiene and in random copolymers of butadiene and isoprene, with both polymerized monomers having predominately 1,4-microstructure. Selective hydrogenation is conducted in the presence of hydrogen and a catalyst made by the reaction of organoaluminum or lithium compounds with transition metal salts of 2-ethylhexanoic acid.

Falk, DIE ANGEWANDTE CHEMIE 21 (1972) 17–23 (No. 286), the entire contents of which are also incorporated herein by reference, discloses the selective hydrogenation of 1,4polybutadiene segments in a block copolymer of 1,4-polybutadiene-1,4-polyisoprene-1,4-polybutadiene.

Hoxmeier, Published European Patent Application 88202449.0, filed on Nov. 2, 1988, Publication Number 0 315 280, published on May 10, 1989, and corresponding U.S. Pat. No. 4,879,349, disclose a method of selectively hydrogenating a polymer made from at least two different conjugated diolefins. One of the two diolefins is more substituted in the 2,3 and/or 4 carbon atoms than the other diolefin and produces tri- or tetra-substituted double bonds after polymerization. The selective hydrogenation is conducted under such conditions as to hydrogenate the ethylenic unsaturation incorporated into the polymer from the lesser substituted conjugated diolefin, while leaving unsaturated at least a portion of the tri- or tetra-ethylenic unsaturation incorporated into the polymer by the more substituted conjugated diolefin.

Mohajer et al., *Hydrogenated linear block copolymers of butadiene and isoprene: effects of variation of composition and sequence architecture on properties,* 23 POLYMER 1523–1535 (September 1982) disclose essentially completely hydrogenated butadiene-isoprene-butadiene (HBIB), HIBI and HBI block copolymers in which butadiene has a predominantly 1, 4-microstructure.

Kuraray K K, Japanese published patent application Number JP-328729, filed on Dec. 12, 1987, published on Jul. 4, 1989, discloses a resin composition comprising 70–99% wt. of a polyolefin (preferably polyethylene or polypropylene) and 1–30% wt. of a copolymer obtained by hydrogenation of at least 50% of the unsaturated bonds of an isoprene/butadiene copolymer.

As exemplified by the foregoing references, the prior art has failed to produce a polymer having a saturated backbone for oxidation stability which has unsaturated bonds only on the ends of block polymer chains. Such a block polymer could be vulcanized or selectively functionalized at the terminal ends thereof. The functionalization would expand the utility of the polymer.

SUMMARY OF THE INVENTION

In accordance with this invention, star-branched block copolymers are provided wherein each branch comprises at least two (2) alternating blocks bonded to each other, the free end of each branch being a block of at least one polymerized hydrocarbon conjugated diene (I) e.g. isoprene, containing at least five (5) carbon atoms, with at least one carbon atom of each pair of residual double-bonded carbon atoms of polymerized conjugated diene (I) units being additionally single-bonded to two carbon atoms, or a copolymer of at least one diene (I) and at least one aryl-substituted olefin, e.g., styrene, the blocks adjacent to said polymerized diene (I) containing blocks constituting at least 50 wt. % of said copolymer and being a polymer of at least one polymerized hydrocarbon conjugated diene (B), e.g., 1,3-butadiene, which is different from diene (I) and contains at least four (4) carbon atoms, with each residual double-bonded carbon atom of polymerized diene (B) units being additionally bonded to a hydrogen atom. After the polymerization is completed, the block polymer may be selectively hydrogenated, so that each (B) polymer block is hydrogenated to such an extent that it contains substantially none of the original ethylenic unsaturation, while each of the. (I) polymer or copolymer blocks retains a sufficient amount of its original ethylenic unsaturation to cure (or vulcanize) the block copolymer.

The copolymers of all embodiments are prepared under anionic polymerization conditions. After the selective hydrogenation reaction, the hydrogenation catalyst is removed from the polymer.

In all embodiments of this invention, whenever a reference is made to the "residual double bond" of the star-branched block copolymer, it is understood to be the residual double bond after the selective hydrogenation reaction. The structure of the residual double bond can be determined in any conventional manner, as is known to those skilled in the art, e.g., by infrared (IR) analysis.

The term "original unsaturation", as used in this application, means the sum total of the unsaturated groups present in the copolymer prior to the selective hydrogenation reaction. The unsaturation can be quantified in any conventional manner, e.g., by reference to the Iodine Number of the polymer.

In any polymers of any of the embodiments of this invention, the microstructure of the polymerized conjugated diene of the (B) polymer block must be such that the polymer is not excessively crystalline after the selective hydrogenation reaction, so that after the selective hydrogenation reaction, the polymer retains its elastomeric properties, e.g., the polymer should contain no more than about 10% of polyethylene crystallinity. This is accomplished by introducing side branches into the polymerized conjugated diene (B), e.g., by controlling the microstructure of 1,3-butadiene if it is the predominant monomer of the (B) diene, by using a mixture of (B) dienes containing less than predominant amounts of 1,3-butadiene, or by using a single (B) diene other than 1,3-butadiene. More particularly, if the conjugated (B) diene(s) is predominantly (at least 50% by mole) 1,3-butadiene, the side branches are introduced into the polymer by insuring that the polymerized (B) diene contains a sufficient amount of the 1,2-units to prevent the selectively hydrogenated polymer from being excessively crystalline. Thus, if the conjugated (B) diene is predominantly (at least 50% by mole, e.g., 100% by mole) 1,3-butadiene, the polymerized (B) diene, prior to the selective hydrogenation reaction, must contain not more than about 75% wt., preferably about 10 to about 70% wt., and most preferably about 35 to about 55% wt. of the 1,4-units (1,4-microstructure), and at least about 25% wt., preferably about 30 to about 90% wt., and most preferably about 35 or 45 wt %. to about 65 wt. % of the 1,2-microstructure. If the polymerized (B) diene(s) contains less than 50% by mole of 1,3-butadiene, e.g., 1,3-pentadiene is used as the only (B) diene, the microstructure of the polymerized (B) diene prior to the selective hydrogenation reaction is not critical since after hydrogenation the resulting polymer will contain substantially no crystallinity.

In all embodiments of the invention, mixtures of (I) and (B) dienes may be used to prepare any of the star-branched block copolymers of this invention. Similarly, mixtures of aryl-substituted olefins may also be used to prepare the star-branched block copolymers of this invention. Accordingly, whenever a reference is made herein to an (I) or (B) diene or to an aryl-substituted olefin, it may encompass more than one (I) or (B) diene and more than one aryl-substituted olefin.

DETAILED DESCRIPTION OF THE INVENTION

Star-branched block polymers containing any combination and number of (I) polymer or copolymer blocks and (B) polymer blocks are contemplated herein, providing that they are terminated by (I) polymer or copolymer blocks. The selectively hydrogenated interior (B) polymer block of each branch of the star-branched block copolymer is substantially completely saturated, while the terminal I polymer blocks contain controlled levels of unsaturation, providing a hydrocarbon elastomer with α-ω unsaturation. The length of the middle saturated block defines the distance between crosslinks ($M_c$) in the vulcanized elastomers. Because of the α-ω placement of the unsaturation, very low levels of residual double bonds are required to attain excellent vulcanization. The low level of unsaturation in the selectively hydrogenated star-branched block polymer and its terminal positioning provide excellent oxidative stability to the polymers of this invention.

Without wishing to be bound by any theory, it is believed that the α-ω placement of unsaturation in the star-branched block polymers of this invention imparts to the polymers excellent elastomeric properties which were absent in prior art thermosetting elastomers which required a multiplicity of relatively closely spaced crosslinks.

The combination of elastomeric properties and oxidative stability possessed by the polymers of this invention makes them suitable for many end uses, such as dynamically vulcanized thermoplastic elastomer blends, belts and hoses, white tire sidewalls, roofing, liners, impact modifiers, mechanical goods, and ionic thermoplastic elastomers.

Many variations in composition, molecular weight, molecular weight distribution, relative block lengths, microstructure, branching, crystallinity and Tg (glass transition temperature) attainable with the use of the anionic techniques employed in the preparation of our polymers will be obvious to those skilled in the art.

While not wishing to limit the molecular weight range of solid elastomers prepared according to our invention, the minimum molecular weight for these solid polymers is at least about 15,000, preferably it is about 50,000 to about 2,000,000, more preferably about 80,000 to about 250,000 and most preferably about 100,000. The block copolymers of this invention are vulcanizable. Without wishing to be bound by any theory of operability, it is believed that they can be crosslinked (or vulcanized) in a controlled manner through the unsaturated groups on the terminal blocks to provide a very strong and orderly matrix of crosslinkages having almost uniform distribution of molecular weights between crosslinks.

The invention will be described hereinafter in terms of the embodiments thereof summarized above. However, it will be apparent to those skilled in the art, that the invention is not limited to these particular embodiments, but, rather, it covers all of the embodiments encompassed by the broadest scope of the description of the invention.

In one embodiment of the invention, there is polymerized a star-branched block copolymer in which each branch comprises at least two alternating blocks:

I-B- wherein:

I is a block of at least one polymerized conjugated diene having at least five (5) carbon atoms and the following formula

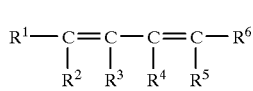

(1)

wherein $R^1$–$R^6$ are each hydrogen or a hydrocarbyl group, provided that at least one of $R^1$–$R^6$ is a hydrocarbyl group, and further provided that the structure of the residual double bond in the polymerized block I has the following formula

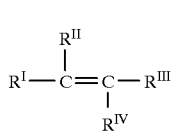

(2)

wherein $R^I$, $R^{II}$, $R^{III}$ and $R^{IV}$ are each hydrogen or a hydrocarbyl group, provided that either both $R^I$ and $R^{II}$ are hydrocarbyl groups or both $R^{III}$ and $R^{IV}$ are hydrocarbyl groups;

B is a block of at least one polymerized conjugated diene, different from that used to polymerize block I, having at least four (4) carbon atoms and the following formula

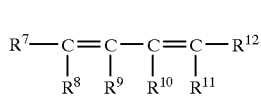

(3)

wherein $R^7$–$R^{12}$ are each hydrogen or a hydrocarbyl group, provided that the structure of the residual double bond in the polymerized block B has the following formula

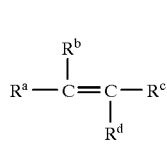

(4)

wherein $R^a$, $R^b$, $R^c$ and $R^d$ are each hydrogen (H) or a hydrocarbyl group, provided that one of $R^a$ or $R^b$ is hydrogen, one of $R^c$ or $R^d$ is hydrogen and at least one of $R^a$, $R^b$, $R^c$ or $R^d$ is a hydrocarbyl group.

In the residual double bond of formula (2), $R^I$, $R^{II}$, $R^{III}$ and $R^{IV}$ may all be hydrocarbyl groups. The structures of the residual double bonds defined by formulae (2) and (4) are necessary to produce star-branched block copolymers which can be selectively hydrogenated in the manner described herein to produce the selectively hydrogenated block copolymers of this invention. The block copolymer comprises about 0.1 to about 50%, preferably about 1 to about 5%, by wt. of the I blocks, and about 50 to about 99.9%, preferably about 95 to about 99%, by wt. of the B blocks.

The hydrocarbyl group or groups in the formulae (1) and (2) are the same or different and they are substituted or unsubstituted alkyl, alkenyl, cycloalkyl, cycloalkenyl, aryl, alkaryl or aralkyl groups or any isomers thereof. Suitable hydrocarbyl groups are alkyls of 1–20 carbon atoms, alkenyls of 1–20 carbon atoms, cycloalkyls of 5–20 carbon atoms, cycloalkenyls of 5–20 carbon atoms, aryls of 6–12 carbon atoms, alkaryls of 7–20 carbon atoms or aralkyls of 7–20 carbon atoms. Examples of suitable alkyl groups are methyl, ethyl, propyl, butyl, pentyl, hexyl, heptyl, octyl, decyl, methyl-decyl or dimethyldecyl. Examples of suitable alkenyl groups are ethenyl, propenyl, butenyl, pentenyl or hexenyl. Examples of suitable cycloalkyl groups are cyclohexyl or methylcyclohexyl. Examples of suitable cycloalkenyl groups are 1-, 2-, or 3-cyclohexenyl or 4-methyl-3- cyclohexenyl. Examples of suitable aryl groups are phenyl or diphenyl. Examples of suitable alkaryl groups are 4-methyl-phenyl (p-tolyl) or p-ethyl-phenyl. Examples of suitable aralkyl groups are benzyl or phenethyl. Suitable conjugated dienes of formula (1) used to polymerize the I block are isoprene, 2,3-dimethyl-butadiene, myrcene, 2-methyl-1,3-pentadiene, 3-methyl-1,3-pentadiene, 4-methyl-1,3-pentadiene, 2-phenyl-1,3-butadiene, 2-phenyl-1,3-pentadiene, 3-phenyl-1,3-pentadiene, 2,3-dimethyl-1,3-pentadiene, 2-hexyl-1,3-butadiene, 3-methyl-1,3-hexadiene, 2-benzyl-1,3-butadiene, 2-p-tolyl-1,3-butadiene or mixtures thereof, preferably isoprene, myrcene or 2-methyl-1,3-pentadiene, and most preferably isoprene.

The hydrocarbyl group or groups in the formula (3) may or may not be the same as those in formula (4). These hydrocarbyl groups are the same as those described above in conjunction with the discussion of the hydrocarbyl groups of formulae (1) and (2). Suitable monomers for the B blocks are 1,3-butadiene, 1,3-pentadiene, 2,4-hexadiene, 1,3-hexadiene, 1,3-heptadiene, 2,4-heptadiene, 1,3-octadiene, 2,4-octadiene, 3,5-octadiene, 1,3-nonadiene, 2,4-nonadiene, 3,5-nonadiene, 1,3-decadiene, 2,4-decadiene, 3,5-decadiene or mixtures thereof, preferably 1,3-butadiene, 1,3-pentadiene or 1,3-hexadiene, and most preferably it is 1,3-butadiene. It is preferred that each of the B blocks is polymerized from a single monomer.

The branches of the star-branched block copolymer of this embodiment each contains an I block at its free end.

The scope of this embodiment and of any other embodiments of the invention wherein the B blocks are used also encompasses polymers wherein the interior B blocks may be comprised of copolymers of one or more conjugated diene of formula (3) and controlled amounts (about 0.1 to about 30 mole %) of an aryl-substituted olefin, e.g., styrene or other suitable monomers (such as alkylated styrene, vinyl naphthalene or alkylated vinyl naphthalene), incorporated for control of glass transition temperature (Tg), density, solubility parameters and refractive index. Suitable aryl-substituted olefins are those described below in conjunction with the second embodiment of the invention. Similarly, the scope of this embodiment also encompasses polymers wherein the interior B blocks may be comprised of copolymers of one or more conjugated diene of formula (3) and any other anionically polymerizable monomer capable of polymerizing with the conjugated diene of formula (3).

It will be apparent to those skilled in the art that proper choice of polymerization parameters can produce polymers with a great variety of compositional and structural differences, falling within the scope of our invention. Changes in composition of the interior B blocks control the nature of the rubbery properties while changes in the I blocks permit response to different vulcanizing agents, e.g., sulfur-based cure systems and phenolic resin cure systems.

In this embodiment of the invention, the microstructure of the I blocks is not critical and may consist of any combination of 1,2-, 3,4 and 1,4-units, schematically represented below for the polyisoprene blocks.

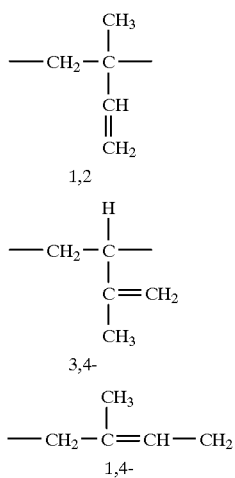

As discussed above, when the predominant monomer used to polymerize the B blocks is 1,3-butadiene, the microstructure of the B blocks should be a mixture of 1,4- and 1,2-units schematically shown below for the polybutadiene blocks:

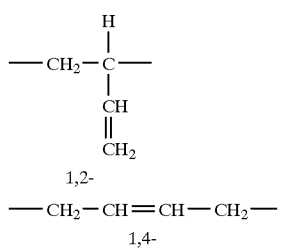

since the hydrogenation of the predominantly 1,4-microstructures produces a crystalline polyethylene segment. The microstructure of the I and B blocks (as well as of the polymerized conjugated dienes of formulae (1) or (3) in any polymers of this invention) is controlled in a conventional manner, e.g., by controlling the amount and nature of the polar compounds used during the polymerization reaction, and the reaction temperature. In one particularly preferred embodiment, the star-branched block copolymer has interior blocks which contain about 55% of the 1,2- and about 45% wt. of the 1,4-microstructure. If the interior B block is polybutadiene, the hydrogenation of such B blocks containing about 50 to about 60% wt. of the 1,2-microstructure content produces an elastomeric interior block which is substantially an ethylene-butene-1 copolymer having substantially no crystallinity. The reduction of the 1,2-content microstructure in the polybutadiene blocks in a controlled manner permits the introduction of controlled levels of crystallinity into the hydrogenated polybutadiene blocks which provides a "green" (unvulcanized) strength necessary in certain applications. If the B blocks are polymerized from 1,3-pentadiene, it is preferred that they have predominantly (at least 50%) 1,4-microstructure, which, after hydrogenation, produces substantially non-crystalline elastomeric blocks.

The terms 1,2-, 1,4-, and 3,4-microstructure or units as used in this application refer to the products of polymerization obtained, respectively, by the 1,2-, 1,4- and 3,4-, additions of monomer units into the growing polymer chain.

We surprisingly discovered that the polymerized conjugated dienes of formula (3), e.g., the B blocks, of the polymers of this invention are selectively hydrogenated in our hydrogenation process much faster than the polymerized conjugated dienes of formula (1), e.g., the I blocks. This is not evident from the teachings of Falk, discussed above, because Falk teaches that double bonds of the disubstituted 1,4-polybutadiene units are hydrogenated selectively in the presence of double bonds of the trisubstituted 1,4-polyisoprene units (which are not hydrogenated). We surprisingly discovered that the disubstituted double bonds of the 1,4-polybutadiene units are hydrogenated along with the monosubstituted double bonds of the 1, 2-polybutadiene units, while the disubstituted double bonds of the 3,4-polyisoprene units are hydrogenated at a much slower rate than the aforementioned butadienes. Thus, in view of Falk's disclosure it is surprising that the disubstituted double bonds of the 1,4-polybutadiene units are hydrogenated selectively in the presence of the disubstituted double bonds of the 3,4-polyisoprene units. This is also surprising in view of the teachings of Hoxmeier, Published European Patent Application, Publication No. 0 315 280, who discloses that the disubstituted double bonds of the 1,4-polybutadiene units, monosubstituted double bonds of the 1,2-polybutadiene units and disubstituted double bonds of the 3,4-polyisoprene units are hydrogenated simultaneously at substantially the same rates. For example, for the star-branched block copolymers of this invention, wherein the I block is polyisoprene and the B block is polybutadiene, Fourier transform infrared (FTIR) analysis of selectively hydrogenated triblock polymers indicates that the hydrogenation of the double bonds of the 1,2-polybutadiene units proceeds most rapidly, followed by the hydrogenation of the double bonds of the 1,4-polybutadiene units. Infrared absorptions caused by these groups disappear prior to appreciable hydrogenation of the polyisoprene units.

After the star-branched block copolymer in which the branches are I-B-diblocks is prepared, it is subjected to a selective hydrogenation reaction to hydrogenate primarily only the interior B blocks of each of the branches. The selective hydrogenation reaction and the catalyst are described in detail below. After the hydrogenation reaction is completed, the selective hydrogenation catalyst is removed from the star-branched block copolymer, and the polymer is isolated by conventional procedures, e.g., alcohol flocculation, steam stripping of solvent or non-aqueous solvent evaporation. An antioxidant, e.g., Irganox 1076 (from Ciba-Geigy), is normally added to the polymer solution prior to polymer isolation.

The isolated polymer is vulcanizable through the unsaturated free ended I blocks by a number of well known processes utilized currently for thermosetting hydrocarbon elastomers. Such processes are detailed in RUBBER TECHNOLOGY, THIRD EDITION, VAN NOSTRAND REINHOLD COMPANY, New York, 1987, Maurice Morton, Editor, chapters 2, 9 and 10, incorporated herein by reference.

In an alternative embodiment of the invention, the branches of the star-branched block copolymer comprises at least two alternating blocks of:

A-D- wherein the free ended A block is a copolymer of at least one aryl-substituted olefin and at least one conjugated diene of formula (1), defined above. The A block is either a random or a block copolymer. The most preferred conjugated diene of formula (1) is isoprene. In this star-branched block copolymer, D is a block of a polymer of at least one conjugated diene of formula (3), discussed above, which is different from the conjugated diene of formula (1). Suitable aryl-substituted olefins used to polymerize the A block have the formula

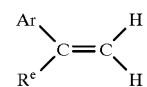

where Ar is phenyl, alkyl-substituted phenyl, naphthyl or alkyl-substituted naphthyl, $R^e$ is hydrogen, methyl, ethyl, propyl, butyl or aryl. Examples of suitable aryl-substituted olefins are styrene, 2-phenyl alpha-olefins, such as alpha-methyl styrene, 1,1-diphenyl ethylene, alkylated styrenes, vinyl naphthalene, or any alkylated vinyl naphthalenes. Suitable alkyl substituents in the alkylated styrenes or alkylated vinyl naphthalenes are methyl, ethyl, propyl, tert-butyl and sec-butyl. Each of the alkylated styrenes or vinyl naphthalenes may contain one or more alkyl substituents. Preferred aryl-substituted olefins are styrene, vinylnapthalene, alpha-methyl styrene, vinyltoluene and diphenylethylene. The microstructure of the polymerized diene of formula (1) is not critical. In the most preferred embodiment, the A block of this star-branched copolymer is polymerized from isoprene and styrene in the molar proportion of about 1:10. The copolymer is generally polymerized by anionic polymerization, discussed in detail below.

Regardless of the molecular weight of the free-ended A block, the scope of this embodiment, and of any other embodiment of the invention wherein the A block is used, also encompasses polymers wherein the A blocks are prepared by, initially, polymerizing at least one aryl-substituted olefin alone, and subsequently reacting the resulting poly-aryl-substituted olefin with any compounds which, after chemical reaction with the poly-aryl-substituted olefin, will provide the residual double bonds to the A blocks, as defined above in conjunction with the discussion of the conjugated diene of formula (1). The resulting A block will therefore have substantially the same residual unsaturation (residual double bonds) on the free-ended A blocks as any other A block made in accordance with this embodiment (or any other embodiment which uses the A block), i.e., by copolymerizing the aryl-substituted olefin with at least one conjugated diene of formula (1).

The scope of this embodiment, and of any other embodiments of the invention wherein the interior D block is used, also encompasses polymers wherein the block D may be comprised of copolymers of one or more conjugated diene of formula (3) and controlled amounts (about 0.1 to about 30 mole %) of an aryl-substituted olefin, e.g., styrene or other suitable monomers (such as alkylated styrene, vinyl naphthalene or alkylated vinyl naphthalene), incorporated for control of glass transition temperature (Tg), density, solubility parameters and refractive index.

While the embodiments of the star-branched block copolymers of this invention described previously have branches composed of I-B- or A-D-diblocks, such polymers can be made from any combination of blocks I and B, A and D, or I, D and A, defined above, providing that each free end (i.e., the uncoupled end) of the star-branched block polymer is either an I or an A block in the star-branched block polymers made from blocks I and B, A and D or I, D and A. The star-branched I-B block copolymers comprise about 0.1 to about 50%, preferably about 1 to about 5% by wt. of the I blocks and about 50 to about 99.9% by wt. of the B blocks. The star-branched A-D block copolymers may have the A blocks of a low molecular weight (about 350 to about 7,500) or of a high molecular weight (about 7,500 to about 20,000). When the A block has a molecular weight of about 350 to about 7,500, it comprises about 50 to about 65%, preferably about 50% by mole of the aryl-substituted olefin, and about 35% to about 50%, preferably about 50% by mole of the conjugated diene of formula (1). When the A block has a molecular weight of about 7,500 to about 20,000, it comprises about 1 to about 99%, preferably about 80 to about 98% by mole of the aryl-substituted olefin, and about 99 to about 1%, preferably about 2 to about 20% by mole of the conjugated diene of formula (1). When the A block has a molecular weight of about 350 to about 7,500, the A-D star-branched block copolymer comprises about 0.25 to about 10%, preferably about 2 to about 10% wt. of the A blocks, and about 80 to about 99.5%, preferably about 80 to about 96% wt. of the D blocks. When the A block has a molecular weight of about 7,500 to about 20,000, the A-D star-branched block copolymer comprises about 0.25 to about 25%, preferably about 10 to about 20% wt. of the A blocks and about 50 to about 99.5%, preferably about 60 to about 80% wt. of the D blocks. In the star-branched I-D-A block copolymers, the A block has a molecular weight of about 350 to about 7,500. The star-branched I-D-A block copolymers comprise about 0.1 to about 50%, preferably about 1 to about 5% wt. of the sum of I and A blocks, and about 50 to about 99.9%, preferably about 95 to about 99% wt. of the D blocks.

The star-branched block polymers are selectively hydrogenated in the selective hydrogenation process to such an extent that the B or D blocks contain substantially none of the original unsaturation, while each of the I and A blocks, respectively, retains a sufficient amount of the original unsaturation of the conjugated dienes present in these blocks to cure the star-branched block polymers. Thus, for the I-B star-branched block polymer, after the selective hydrogenation reaction, the Iodine Number for the I blocks is about 10 to about 100%, preferably about 25 to about 100%, more preferably about 50 to about 100% of their Iodine Number prior to the selective hydrogenation reaction, and for the B blocks it is about 0 to about 10% of the Iodine Number prior to the selective hydrogenation reaction. For the A-D star-branched block polymer, after the selective hydrogenation reaction, the Iodine Number for the A blocks is about 10 to about 100%, preferably about 25 to about 100%, more preferably about 50 to about 100% of the Iodine Number prior to the selective hydrogenation reaction, and for the D blocks it is about 0 to about 10% of the Iodine Number prior to the selective hydrogenation reaction. Similarly, for the I-D-A star-branched block polymer, the Iodine Number for each of the I and A blocks after the selective hydrogenation is completed is about 10 to about 100% of the Iodine Number prior to the selective hydrogenation reaction, and for the D blocks it is about 0 to about 10% of the Iodine Number prior to the selective hydrogenation reaction. Thus, in this embodiment, the D block is also selectively hydrogenated in the same manner as discussed above for the interior B and D blocks of the other embodiments of the invention.

Blends Of Inventive Polymers With Other Materials

The star-branched block copolymers of this invention can, of course, be blended with any rubbers, in which case the degree of unsaturation of the copolymers of the invention can be adjusted so that the vulcanization rate of the two materials is substantially the same. Suitable rubbers which can be blended with the copolymers of this invention are EPDM, butyl rubber and rubbers based on butadiene or isoprene.

The star-branched block copolymers of this invention can also be blended with plastics, e.g., isotactic polypropylene, polystyrene, polyethylene, Nylon, polycarbonates, polyesters and styrene-acrylonitrile resins. Thermoplastic elastomers having excellent properties can be obtained by dynamically vulcanizing a blend of polypropylene and the elastomers of our invention, in which the elastomers are crosslinked to a very high degree. A commercial material, Santoprene (trademark of and produced by Monsanto Chemical Co.) is based upon blends of polypropylene and EPDM. Details of the preparation and properties of such blends are presented in THERMOPLASTIC ELASTOMERS, A COMPREHENSIVE REVIEW, edited by N. R. Legge et al., Chapter 7, Hanser Publishers, Munich, Vienna and New York (1987), the contents of which are incorporated herein by reference. Such dynamically vulcanized blends prepared with the polymers of the invention in a conventional manner, e.g., that of N. R. Legge et al., wherein the polymers of this invention are blended with polypropylene can provide thermoplastic elastomers with unique elastomeric properties.

The star-branched block copolymers of this invention can, of course, be compounded with ingredients known to those skilled in the art, e.g., fillers, such as silica, carbon block, extender oils, antioxidants, tackifying agents, vulcanizing agents and similar materials.

Polymerization Reaction

The branches of the star-branched block copolymers of this invention are polymerized by any known block polymerization processes, preferably by an anionic polymerization process. Anionic polymerization is well known in the art, and it is utilized in the production of a variety of commercial polymers. An excellent comprehensive review of the anionic polymerization processes appears in the text ADVANCES IN POLYMER SCIENCE 56, ANIONIC POLYMERIZATION, pp. 1–90, Springer-Verlag, Berlin, Heideberg, New York, Tokyo 1984 in a monograph entitled ANIONIC POLYMERIZATION OF NON-POLAR MONOMERS INVOLVING LITHIUM, by R. N. Young, R. P. Quirk and L. J. Fetters, incorporated herein by reference. The anionic polymerization process is conducted in the presence of a suitable anionic catalyst (also known as an initiator), such as n-butyl-lithium, sec-butyl-lithium, t-butyl-lithium, sodium naphthalide or cumyl potassium. The amount of the catalyst and the amount of the monomer in the polymerization reaction dictate the molecular weight of the polymer. The polymerization reaction is conducted in solution using an inert solvent as the polymerization medium, e.g., aliphatic hydrocarbons, such as hexane, cyclohexane or heptane, or aromatic solvents, such as benzene or toluene. In certain instances, inert polar solvents, such as tetrahydrofuran, can be used alone as a solvent, or in a mixture with a hydrocarbon solvent.

The block polymerization process will be exemplified below for the polymerization of the first embodiment of the invention, and specifically for the preferred embodiment thereof, i.e., wherein the branches of the star-branched blocks are diblocks of polyisoprene-polybutadiene.

However, it will be apparent to those skilled in the art that the same process principles can be used for the polymerization of all the star-branched block copolymers of the invention.

The process, when using a lithium-based catalyst, comprises forming a solution of the isoprene monomer in an inert hydrocarbon solvent, such as cyclohexane, modified by the presence therein of one or more polar compounds selected from the group consisting of ethers, thioethers and tertiary amines, e.g., tetrahydrofuran. The polar compounds are necessary to control the microstructure of the butadiene center block, i.e., the content of the 1,2-structure thereof. The higher the content of the polar compounds, the higher will be the content of the 1,2-structure in these blocks. Since the presence of the polar compound is not essential in the formation of the first polymer block with many initiators unless a high 3,4-structure content of the first block is desired, it is not necessary to introduce the polar compound at this stage, since it may be introduced just prior to or together with the addition of the butadiene in the second polymerization stage. Examples of polar compounds which may be used are dimethyl ether, diethyl ether, ethyl methyl ether, ethyl propyl ether, dioxane, diphenyl ether, tripropyl amine, tributyl amine, trimethyl amine, triethyl amine, and N-,N-,N'-,N'-tetramethyl ethylene diamine. Mixtures of the polar compounds may also be used. The amount of the polar compound depends on the type of the polar compound and the polymerization conditions as will be apparent to those skilled in the art. The effect of the polar compounds on the polybutadiene microstructure is detailed in ANTKOWIAK et al, TEMPERATURE AND CONCENTRATION EFFECTS ON POLAR-MODIFIED ALKYL LITHIUM POLYMERIZATIONS AND COPOLYMERIZATIONS, JOURNAL OF POLYMER SCIENCE: Part A-1, Vol. 10, 1319–1334 (1972), incorporated herein by reference. The polar compounds also accelerate the rate of polymerization. If monomers other than butadiene, e.g., pentadiene, are used to polymerize the interior blocks B or D, polar compounds are not necessary to control the microstructure because such monomers will inherently produce polymers which do not possess crystallinity after hydrogenation.

When the alkyl lithium-based initiator, a polar compound and an isoprene monomer are combined in an inert solvent, polymerization of the isoprene proceeds to produce the fee-ended I block whose molecular weight is determined by the ratio of the isoprene to the initiator. The "living" polyisoprenyl anion formed in this first step is utilized as the catalyst for further polymerization. At this time, butadiene monomer is introduced into the system and block polymerization of the second block proceeds, the presence of the polar compound now influencing the desired degree of branching (the 1,2-structure content) in the polybutadiene block. The resulting product is a living diblock I-B-polymer having a terminal anion and a lithium counterion. The polymerization reaction is usually conducted at a temperature of between 0° C. and about 100° C., although higher temperatures can be used. Control of a chosen reaction temperature is desirable since it can influence the effectiveness of the polar compound additive in controlling the polymer microstructure. The reaction temperature can be, for example, from 50 to 80° C. The reaction pressure is not critical and varies from atmospheric to about 100 psig. If the polar compounds are utilized prior to the polymerization of the I block such I block will have a high 3,4-unit content. If polar compounds (some of which can be Lewis bases) are added after the I block segment is prepared, the I block will have a high percentage of 3,4-microstructure.

The substitution of myrcene for the isoprene during the polymerization of the I block insures the incorporation of a high proportion of trisubstituted double bonds, even in the presence of polar compounds since myrcene contains a pendant trisubstituted double bond which is not involved in the polymerization process. After the formation of the living I-B-diblock anions, the star-branched block copolymer of the invention containing I-B-diblocks as the branches may be formed by reacting the living I-B-diblock anions with an appropriate coupling agent such as divinyl benzene (DVB). The addition of divinyl benzene as a coupling agent has been documented to produce molecules having up to 20 or more separately joined segments.

Although the production of the star-branched block copolymers of this invention has been exemplified wherein the branches are I-B-diblocks, such star-branched block polymers may be made from any combination of blocks I and B, A and D or I, D and A, discussed above, providing that each free end (i.e., uncoupled end) of the star-branched polymer is either an I or an A block, respectively. The molecular weight of the star-branched block copolymers will depend on the number of branches in each such copolymer, as will be apparent to those skilled in the art. Suitable coupling agents and reactions are disclosed in the following references which are incorporated herein by reference: U.S. Pat. Nos. 3,949,020; 3,594,452; 3,598,887; 3,465,065; 3,078,254; 3,766,301; 3,632,682; 3,668,279; and Great Britain patents 1,014,999; 1,074,276; 1,121,978.

Selective Hydrogenation

The selective hydrogenation reaction will also be described below using a star-branched block copolymer wherein the branches are a diblock of polyisoprene-polybutadiene as an example. However, it will be apparent to those skilled in the art that any polymers of this invention can be selectively hydrogenated in the same manner.

The block copolymer is selectively hydrogenated to saturate the interior (polybutadiene) block of each of the diblock branches. The method of selectively hydrogenating the polybutadiene block is similar to that of Falk, "Coordination Catalysts For The Selective Hydrogenation of Polymeric Unsaturation", JOURNAL OF POLYMER SCIENCE: PART A-1, Volume 9, 2617–2623 (1971), but it is conducted with the novel hydrogenation catalyst and process used herein. Any other known selective hydrogenation methods may also be used, as will be apparent to those skilled in the art, but it is preferred to use the method described herein. In summary, the selective hydrogenation method preferably used herein comprises contacting the previously-prepared star-branched block copolymer with hydrogen in the presence of the novel catalyst composition.

The novel hydrogenation catalyst composition and hydrogenation process are described in detail in previously cited application Ser. No. 07/466,136. The hydrogenation catalyst composition is synthesized from at least one transition metal compound and an organometallic reducing agent.

Suitable transition metal compounds are compounds of metals of Group IVb, Vb, VIb, or VIII, preferably IVb or VIII of the Periodic Table of the Elements, published in LANGE's HANDBOOK OF CHEMISTRY (13th Edition, 1985, McGraw-Hill Book Company, New York, John A. Dean, Editor). Non-limiting examples of such compounds are metal halides, e.g., titanium tetrachloride, vanadium tetrachloride; vanadium oxytrichloride, titanium and vanadium alkoxides, wherein the alkoxide moiety has a branched or unbranched alkyl radical of 1 to about 20 carbon atoms, preferably 1 to about 6 carbon atoms. Preferred transition metal compounds are metal carboxylates or alkoxides of Group IVb or VIII of the Periodic Table of the Elements, such as nickel (II) 2-ethylhexanoate, titanium isopropoxide, cobalt (II) octoate, nickel (II) phenoxide and ferric acetylacetonate.

The organometallic reducing agent is any one or a combination of any of the materials commonly employed to activate Ziegler-Natta olefin polymerization catalyst components containing at least one compound of the elements of Groups Ia, IIa, IIb, IIIa, or IVa of the Periodic Table of the Elements. Examples of such reducing agents are metal alkyls, metal hydrides, alkyl metal hydrides, alkyl metal halides, and alkyl metal alkoxides, such as alkyllithium compounds, dialkylzinc compounds, trialkylboron compounds, trialkylaluminum compounds, alkylaluminum halides and hydrides, and tetraalkylgermanium compounds. Mixtures of the reducing agents may also be employed. Specific examples of useful reducing agents include n-butyllithium, diethylzinc, di-n-propylzinc, triethylboron, diethylaluminumethoxide, triethylaluminum, trimethylaluminum, triisobutylaluminum, tri-n-hexylaluminum, ethylaluminum dichloride, dibromide, and dihydride, isobutyl aluminum dichloride, dibromide, and dihydride, diethylaluminum chloride, bromide, and hydride, di-n-propylaluminum chloride, bromide, and hydride, diisobutylaluminum chloride, bromide and hydride, tetramethylgermanium, and tetraethylgermanium. Organometallic reducing agents which are preferred are Group IIIa metal alkyls and dialkyl metal halides having 1 to about 20 carbon atoms per alkyl radical. More preferably, the reducing agent is a trialkylaluminum compound having 1 to about 6 carbon atoms per alkyl radical. Other reducing agents which can be used herein are disclosed in Stevens et al, U.S. Pat. No. 3,787,384, column 4, line 45 to column 5, line 12 and in Strobel et al, U.S. Pat. No. 4,148,754, column 4, line 56 to column 5, line 59, the entire contents of both of which are incorporated herein by reference. Particularly preferred reducing agents are metal alkyl or hydride derivatives of a metal selected from Groups Ia, IIa and IIIa of the Periodic Table of the Elements, such as n-butyl lithium, sec-butyl lithium, n-hexyl lithium, phenyl-lithium, triethylaluminum, tri-isobutylaluminum, trimethylaluminum, diethylaluminum hydride and dibutylmagnesium.

The molar ratio of the metal derived from the reducing agent to the metal derived from the transition metal compound will vary for the selected combinations of the reducing agent and the transition metal compound, but in general it is about 1:1 to about 12:1, preferably about 1.5:1 to about 8:1, more preferably about 2:1 to about 7:1 and most preferably about 2.5:1 to about 6:1. It will be apparent to those skilled in the art that the optimal ratios will vary depending upon the transition metal and the organometallic agent used, e.g., for the trialkylalumium/nickel(II) systems the preferred aluminum:nickel molar ratio is about 2.5:1 to about 4:1, for the trialkylaluminum/cobalt(II) systems the preferred aluminum:cobalt molar ratio is about 3:1 to about 4:1 and for the trialkylaluminum/titanium(IV) alkoxides systems, the preferred aluminum:titanium molar ratio is about 3:1 to about 6:1.

The mode of addition and the ratio of the reducing agent to the transition metal compound are important in the production of the novel hydrogenation catalyst having superior selectivity, efficiency and stability, as compared to prior art catalytic systems. During the synthesis of the hydrogenation catalysts it is preferred to maintain the molar ratio of the reactants used to synthesize the catalyst substantially constant.

This can be done either by the addition of the reducing agent as rapidly as possible to a solution of the transition metal compound, or by a substantially simultaneous addition of the separate streams of the reducing agent and the transition metal compound to a catalyst synthesis vessel in such a manner that the selected molar ratios of the metal of the reducing agent to the metal of the transition metal compound are maintained substantially constant throughout substantially the entire time of addition of the two compounds. The time required for the addition must be such that excessive pressure and heat build-up are avoided, i.e., the temperature should not exceed about 80° C. and the pressure should not exceed the safe pressure limit of the catalyst synthesis vessel.

In a preferred embodiment, the reducing agent and the transition metal compound are added substantially simultaneously to the catalyst synthesis vessel in such a manner that the selected molar ratio of the reducing agent to the transition metal compound is maintained substantially constant during substantially the entire time of the addition of the two compounds. This preferred embodiment permits the control of the exothermic reaction so that the heat build-up is not excessive, and the rate of gas production during the catalyst synthesis is also not excessive-accordingly the gas build-up is relatively slow. In this embodiment, carried out with or without solvent diluent, the rate of addition of the catalyst components is adjusted to maintain the synthesis reaction temperature at or below about 80° C., which promotes the formation of the selective hydrogenation catalyst. Furthermore, the selected molar ratios of the metal of the reducing agent to the metal of the transition metal compound are maintained substantially constant throughout the entire duration of the catalyst preparation when the simultaneous mixing technique of this embodiment is employed.

In another embodiment, the catalyst is formed by the addition of the reducing agent to the transition metal compound. In this embodiment, the timing and the order of addition of the two reactants is important to obtain the hydrogenation catalyst having superior selectivity, efficiency and stability. Thus, in this embodiment, it is important to add the reducing agent to the transition metal compound in that order in as short a time period as practically possible. In this embodiment, the time allotted for the addition of the reducing agent to the transition metal compound is critical for the production of the catalyst. The term "as short a time period as practically possible" means that the time of addition is as rapid as possible, such that the reaction temperature is not higher than about 80° C. and the reaction pressure does not exceed the safe pressure limit of the catalyst synthesis vessel. As will be apparent to those skilled in the art, that time will vary for each synthesis and will depend on such factors as the types of the reducing agents, the transition metal compounds and the solvents used in the synthesis, as well as the relative amounts thereof, and the type of the catalyst synthesis vessel used. For purposes of illustration, a solution of about 15 ml of triethylaluminum in hexane should be added to a solution of nickel(II) octoate in mineral spirits in about 10–30 seconds. Generally, the addition of the reducing agent to the transition metal compound should be carried out in about 5 seconds (sec) to about 5 minutes, depending on the quantities of the reagents used. If the time period during which the reducing agent is added to the transition metal compound is prolonged, e.g., more than 15 minutes, the synthesized catalyst is less selective, less stable and may be heterogeneous.

In the embodiment wherein the reducing agent is added as rapidly as possible to the transition metal compound, it is also important to add the reducing agent to the transition metal compound in the aforementioned sequence to obtain the novel catalyst. The reversal of the addition sequence, i.e., the addition of the transition metal compound to the reducing agent, or the respective solutions thereof, is detrimental to the stability, selectivity, activity and homogeneity of the catalyst and is therefore undesirable.

In all embodiments of the hydrogenation catalyst synthesis, it is preferred to use solutions of the reducing agent and the transition metal compound in suitable solvents, such as hydrocarbon solvents, e.g., cyclohexane, hexane, pentane, heptane, benzene, toluene or mineral oils. The solvents used to prepare the solutions of the reducing agent and of the transition metal compound may be the same or different, but if they are different, they must be compatible with each other so that the solutions of the reducing agent and the transition metal compound are fully soluble in each other.

The hydrogenation process comprises contacting the unsaturated polymer to be hydrogenated with an amount of the catalyst solution containing about 0.1 to about 0.5, preferably about 0.2 to about 0.3 mole percent of the transition metal based on moles of the polymer unsaturation. The hydrogen partial pressure is about 5 psi to about several hundred psi, but preferably it is about 10 to about 100 psi. The temperature of the hydrogenation reaction mixture is about 25° to about 80° C., since higher temperatures may lead to catalyst deactivation. The length of the hydrogenation reaction may be as short as 30 minutes and, as will be apparent to those skilled in the art, depends to a great extent on the actual reaction conditions employed. The hydrogenation process may be monitored by any conventional means, e.g., infra-red spectroscopy, hydrogen flow rate, total hydrogen consumption, or any combination thereof.

After the hydrogenation reaction is completed, the hydrogenation catalyst must be removed from the polymer by any conventional means, for example, in the case of a nickel-based catalyst by contacting the polymer with a complexing agent, such as a high molecular weight diamine (e.g., Jeffamine D-2000 from Texaco), and then with an acid, e.g., sulfuric, phosphoric or hydrochloric acid, in the presence of an oxidizing agent, e.g., air or hydrogen peroxide. The polymer solution is then water-washed and the polymer isolated by conventional methods, e.g., steam or alcohol flocculation or solvent evaporation.

Crosslinking And Functionalization Of The Terminal Blocks

In addition to acting as sites for vulcanization, the unsaturated free-ended blocks of the star-branched block polymers of this invention can be chemically modified to provide benefits obtained with similar modifications of existing commercial materials, such as butyl rubber or EPDM. In some instances, the benefits obtained by a chemical modification of butyl rubber or EPDM may be magnified using the elastomers of our invention as a matrix instead of the butyl rubber or EPDM because of their intrinsically superior elastomeric properties.

An example of such a chemical modification of the polymers of this invention is sulfonation of the olefinic unsaturation of the I blocks or polymerized dienes of formula (1) of any polymers of this invention containing the I blocks or polymerized dienes of formula (1), followed by neutralization of the thus-formed polymeric sulfonic acid with metal ions or amines. When such a modification is performed on a commercial ethylene-propylene-diene monomer (EPDM) rubber, a thermoplastic elastomer which behaves like a vulcanized rubber at room temperature but can be shaped at higher temperatures is produced. A description of an example of a process for and product description of such a chemically modified EPDM can be found in IONS IN POLYMERS, Advances in Chemistry Series 187, American Chemical Society, Washington, D.C. 1980, pp. 3–53, incorporated herein by reference. Following the procedures used for EPDM described in the aforementioned publication with the triblock of our invention, thermoplastic elastomers with greatly improved elongation properties were prepared.

It is known that the halogenation of the unsaturation in butyl rubber (based upon isoprene monomer) prior to the vulcanization treatment, produces dramatic changes in vulcanization rate and provides greater versatility in the choice of vulcanizing agents. Since the residual unsaturated groups in the first embodiment of our invention, present in the I block, in the most preferred embodiment, may also be based on isoprene monomer, the halogenation of the polymer of this embodiment provides the same benefits, but with the retention of the greater elongation characteristics inherent in the invention polymer. The same benefits will be obtained with any other dienes which can be used to prepare the I block of this embodiment of the invention, and therefore any polymers of this invention containing any such dienes can be halogenated in the same manner as the butyl rubber. Any other polymers of this invention containing the polymerized dienes of formula (1) or I blocks can also be halogenated in the same manner.

It is also known that the reaction of EPDM with maleic anhydride at elevated temperatures (e.g., about 150° C. to about 250° C.) produces maleic modified EPDM which is used commercially as an impact modifier, particularly for Nylon. Similar modification of the polymers of any embodiments of our invention occurs readily, since the residual isoprene unsaturation, primarily of the illustrated 3,4-type, is known to be more reactive with maleic anhydride than are the internal bonds found in EPDM. The resultant impact modifier, because of its greater elongation, provides superior properties when blended with Nylon.

EPDM polymers which have been modified with polar functionality are utilized as dispersant type viscosity index improvers in multigrade lubricants. A great number of patents are devoted to such modifications. Any of the modifications performed on EPDM for this purpose can be performed with the polymers of this invention. Typical modifications which can be used with the polymers of this invention are described in: U.S. Pat. Nos. 3,099,644; 3,257, 349; 3,448,174; 3,997,487; 3,870,841; 3,642,728; 3,847, 854; 3,437,556; 4,557,849; 4,032,700; 3,899,434; 4,557, 847; 4,161,452; 4,170,562; 4,517,104; 4,320,017; 4,502, 972; 4,098,710; 4,007,121; 4,011,380; 4,033,888; 4,145, 298; 4,402,844; 4,146,489 and British patent 1,072,796, the disclosures of all of which are incorporated herein by reference.

The above examples illustrate only some of the potentially valuable chemical modifications of the polymers of this invention. The high molecular weight block polymers of this invention, providing a means for a wide variety of chemical modifications only at the ends of the branches of the star-branched copolymer molecule (i.e., at the I blocks only), present the opportunity to prepare materials previously impossible because of the lack of availability of such polymers. Some examples of well known chemical reactions which can be performed on polymers of this invention are found in E. M. FETTES, CHEMICAL REACTIONS OF POLYMERS, High Polymers, Vol. 19, John Wiley, New York, 1964, incorporated herein by reference.

Our invention provides block hydrocarbon polymers capable of being vulcanized to a perfect network with a distance between crosslinks substantially equivalent to the dimensions of the unvulcanized elastomeric star-branched block copolymer molecule. In addition to the expected improvements in elastomeric properties, the saturated main portion of the branches of the star-branched block copolymers of our invention provides a high degree of oxidative and thermal stability. Unique materials can also be obtained by chemical modifications of the polymers of this invention, since such modifications can be carried out selectively only at the unsaturated free ends of the branches of the molecules.

The crosslinking of the selectively hydrogenated star-branched block polymers of this invention is conducted in a conventional manner by contacting the polymer with a suitable crosslinking agent or a combination of such agents. The crosslinking process produces a copolymer having uniform distance between cross-links.

The star-branched block copolymers can also be functionalized by reacting the terminal blocks containing unsaturated groups with various reagents to produce functional groups, such as hydroxyl, epoxy, sulfonic acid, mercapto, acrylate or carboxyl groups. Functionalization methods are well known in the art.

The star-branched block copolymers, of this invention can be used in a variety of applications, e.g., to produce electrical insulation, pressure sensitive adhesives, sealants, rubberized asphalts, in automotive applications, e.g., hoses, tubing, weatherstripping, in construction industry, e.g., to produce gaskets, rubber sheeting for roofing, pond and ditch liners, and in many other applications.

The following examples further illustrate additional features of the invention. However, it will be apparent to those skilled in the art that the specific reactants and reaction conditions used in the Examples do not limit the scope of the invention.

In all of the following examples, the experimental work was performed with dried reactors and equipment and under strictly anaerobic conditions. Extreme care must be used to exclude air, moisture and other impurities capable of interfering with the delicate chemical balance involved in the synthesis of the polymers of this invention, as will be apparent to those skilled in the art.

EXAMPLE I

This example illustrates the preparation of a star-shaped polymer wherein the arms or branches are diblocks, each of which has a polyisoprene block (I block) at its free end and a poly-1,3-butadiene block (B block) at its interior, such that the polymer comprises 4 wt. % of polyisoprene and 96 wt. % of polybutadiene. The example further illustrates the correlation between the molecular weight and number of branches of the star polymer, with the time of the coupling reaction.

Stage 1: Synthesis of Polyisoprene Block

A one-gallon reactor was equipped with an air driven stirrer and pressure gauge, thermocouple, top face inlet valve, dip tube feeder with valve, heating coils and temperature controller and combination nitrogen-vacuum inlet with valve. Air and moisture were removed from the hot reactor heated by using a heating gun under vacuum-and-purge cycle by dry nitrogen before introducing any chemicals. Two thousand two hundred and fifty milliliters (ml) of purified, dried cyclohexane were introduced to the stirred glass reactor. One ml of a 0.1 M solution of 2,2'-dipyridyl in cyclohexane, 12 ml of tetrahydrofuran freshly distilled from benzophenone ketyl, and 8.8 ml of purified isoprene were injected into the reactor. The temperature of the reactor and its contents was raised to 50° C. The solution was then titrated by the addition of 1.6 M butyllithium until a persistent red color was obtained. Following this, 3.75 ml of 1.6 butyllithium were injected into the reactor in order to initiate polymerization of isoprene. The reaction was allowed to run for 2.5 hours at 50° C. to obtain living polyisoprene anions.

In stage 1, polymerization of isoprene, gas chromatography (GC) was successfully applied as a tool to determine precisely the actual isoprene content from 0.669% (before reaction) to 0.0008% (after reaction) in the reaction medium during polymerization. A standard GC calibration chart was developed for the determination of a known amount of isoprene in methanol and the actual amount of isoprene was very close to the measured amount obtained from the GC area of isoprene (1:0.985). Since polyisoprene was precipitated in methanol and isoprene (monomer) was soluble in methanol, the exact amount of isoprene remaining in the reaction medium was detected by injecting this solution into the GC. Thus, known amounts of polymer solution (e.g., 5 ml.) during isoprene polymerization at different times were withdrawn and precipitated into containers with known amounts of methanol (e.g. 50 ml), and the mixed solution was immediately injected into the GC to measure the residual isoprene content (t) in the solution. The unreacted amount of isoprene could be calculated by comparing the peak area with the standard GC curve. Based on these studies, it was concluded that 60 minutes is sufficient time for isoprene polymerization in stage 1 if the polymerization temperature is above 45° C. There was no detectable isoprene (by gas chromatography) in the reactor after 60–80 minutes at 45° C., after 50 minutes at 50° C., and after 30–40 minutes at 55° C.

Stage 2: Block Copolymerization with 1,3-butadiene

Purified, dried 1,3-butadiene in an amount of 232.3 ml was pressured into the reactor at a rate such that the reaction temperature did not exceed 60° C. After one hour, the reactor pressure had returned to its initial level and the formation of the second block of the diblock copolymer living anions was completed. The number average molecular weight ($M_n$) of the polyisoprene-polybutadiene diblock copolymer anions was found to be 34,300, where $M_n$ is defined as follows:

Polymer $M_n$ (gram/mole)=[Weight of Monomer (grams)]/[Initiator Concentration (moles)]

In stage 2, butadiene block copolymerization, the butadiene conversion was determined by measuring weight percent of polymer formed. Polymer molecular weights were also determined. Solution samples were taken from the reactor every 10 minutes. The weight percent of polymer was determined by applying heat and vacuum to remove solvent and unreacted monomer, and the conversion was then calculated based on the theoretical weight percent at 100% conversion at temperatures of 35°, 40°, 45°, and 50° C. in order to determine reaction kinetics. Based on these studies, it was found that 40 minutes were sufficient for butadiene polymerization in stage 2, provided that the polymerization temperature was above 40° C.

Stage 3: Divinylbenzene (DVB) Coupling of Living Polymeric Anions

Divinylbenzene, in an amount of 6.57 ml of a 78% mixture of para- and ortho-isomers, was then injected into the reactor at 45° C., to effectuate the formation of the star polymer. The molar ratio of DVB to diblock copolymer anions was 6/1. Samples of star polymers were taken at different times as shown in Table 1 (Samples 1–9) and the molecular weights were determined by gel permeation chromatography (GPC). Most of the coupling took place immediately. Fifteen minutes after DVB addition, the polymer formed 14 arms and no uncoupled diblock anions could be detected by GPC. However, some increase in molecular weight and number of arms were obtained with additional coupling time. In addition, the narrow range of molecular weight distribution (MWD) of these polymers, which varied between 1.08 and 1.14, indicated a high coupling efficiency. The number of arms in the star polymer was calculated as follows:

Number of Arms in Star Polymer=[$M_n$ after Coupling/$M_n$ before Coupling]

The reaction was terminated by injecting diacetone alcohol until the color of the reaction mixture changed from a dark amber to colorless. The mixture was cooled to room temperature and filtered through alumina/Celite. An anti-oxidant Irganox 1076 from Ciba-Geigy (100 ppm based on dry polymer) was added and solvent was removed under reduced pressure to yield a star polymer as a clear, colorless, viscous fluid. Infra-red analysis (FTIR) showed the butadiene block to possess 55% 1,2- and 45% 1,4- microstructure.

The coupling times, number average molecular weights ($M_n$) and the number of arms of the withdrawn polymer samples are shown in Table 1.

TABLE 1

| Sample No. | Coupling Time | $M_n$ | No. of Arms |
| --- | --- | --- | --- |
| 1 | 0 min | 34,300 | 1 |
| 2 | 15 min | 486,000 | 14 |
| 3 | 30 min | 545,000 | 16 |
| 4 | 1 h. | 606,000 | 18 |
| 5 | 2 h. | 663,000 | 19 |
| 6 | 4 h. | 675,000 | 20 |
| 7 | 6 h. | 693,000 | 20 |
| 8 | 8 h. | 734,000 | 21 |
| 9 | 16 h. | 757,000 | 22 |

EXAMPLE II

This example was similar to Example I except that it was scaled up to a 5 gallon reactor, pentane instead of cyclohexane was the reaction medium, and the amounts of dienes employed were such that the star polymers obtained contained 16 wt. % of polyisoprene and 84 wt. % of polybutadiene.

The procedure of Example I was followed except that in Stage 1 a five gallon reactor was employed, 13,488 ml of purified dried pentane were introduced into the reactor, and 4.7 ml of a 0.1 M solution of 2,2'-dipyridyl in cyclohexane, 185 ml of tetrahydrofuran freshly distilled from benzophenone ketyl, and 178 ml of purified isoprene were then injected into the reactor. Subsequently, the temperature of the reactor and its contents were raised to 50° C. and the solution was titrated by the addition of 1.6 M butyllithium. Then 47.3 ml of 1.6 M butyllithium were injected into the reactor in order to initiate polymerization of isoprene, and the reaction was allowed to run for 80 minutes at 50° C. to obtain living polyisoprene anions.

In stage 2, 1,027 ml of purified, dried 1,3-butadiene were pressured into the reactor at a rate such that the reaction temperature did not exceed 60° C. After one hour, the reactor pressure had returned to its initial level and the formation of the second block of the copolymer was completed to obtain polyisoprene-polybutadiene diblock copolymer anions having a weight average molecular weight ($M_w$) of 1.53×10$^4$, a $M_n$ of 1.48×10$^4$ and a molecular weight average distribution of 1.03.

In stage 3, 83.1 ml of the 78% mixture of para- and ortho-isomers of divinylbenzene (DVB) were injected into the reactor at 50° C., to allow the formation of the star polymer. Samples of star polymers were taken every hour as shown in Table 2 (Samples 10–14), and the molecular weights ($M_n$) measured by GPC. One hour after DVB addition, a polymer was formed with 28 arms and no uncoupled diblock anions could be detected by GPC. Again, the narrow MWD (1.02–1.05) indicated a high coupling efficiency. In the five gallon reactor, a two-hour coupling time was enough for the formation of star-shaped polymers with approximately 30 arms when a molar ratio of DVB/living anions of 6/1 at 50° C. was used.

The reaction was terminated by injecting 4.7 ml of diacetone alcohol until the color of the reaction mixture changed from a dark amber to colorless. The mixture was cooled to room temperature and filtered through alumina/Celite. An anti-oxidant Irganox 1076 from Ciba-Geigy (100 ppm based on dry polymer) was added and solvent was removed under reduced pressure to yield a star polymer as a clear, colorless, viscous fluid.

The coupling times and values of, ($M_w$), ($M_n$), MWD and the number of arms for the samples of this example are shown in Table 2.

TABLE 2

| Sample No. | Coupling Time | $M_w$ | $M_n$ | MWD | No. of Arms |
| --- | --- | --- | --- | --- | --- |
| 10 | 0 min | 1.53 × 10$^4$ | 1.48 × 10$^4$ | 1.03 | 1 |
| 11 | 1 h. | 4.25 × 10$^4$ | 4.15 × 10$^5$ | 1.03 | 28 |
| 12 | 2 h. | 4.44 × 10$^5$ | 4.34 × 10$^5$ | 1.02 | 29 |
| 13 | 3 h. | 4.93 × 10$^5$ | 4.78 × 10$^5$ | 1.03 | 32 |
| 14 | 4 h. | 5.37 × 10$^5$ | 5.13 × 10$^5$ | 1.05 | 35 |

EXAMPLE III

The procedure of Example I utilizing a one gallon reactor and cyclohexane as the reaction medium was generally followed except that the amounts of diene were employed such that the star polymers obtained, except for sample 17, contained 8 wt. % of isoprene and 92 wt. % of butadiene and the amount of DVB employed was varied to show the effect of the DVB/living anions molar ratio on the number of arms obtained. In sample 17, the first block formed was a copolymer of isoprene and styrene to determine, in comparison with sample 16, whether the presence of sytrene had any appreciable effect on the number of arms formed in the star polymer at a constant DVB/polymer anion molar ratio.

In stage 1, for each of samples 15–21 except sample 17, 2250 ml of purified, dried cyclohexane were introduced to the stirred glass reactor, 1 ml of a 0.1 M solution of dipyridyl in cyclohexane, 12 ml of tetrahydrofuran freshly distilled from benzophenone ketyl, and 17.6 ml of purified isoprene were injected into the reactor, and after the temperature of the reactor and its contents was raised to 50° C., the solution was titrated by the addition of 1.6 M butyllithium until a persistent red color was obtained. Following this, 3.13 ml of 1.6 butyllithium was injected into the reactor in order to initiate polymerization of isoprene. The reaction was allowed to run for 110 minutes at 50° C. to obtain living polyisoprene anions. In sample 17, the same procedure was followed except that 18.2 ml of purified styrene were injected into the reactor with the isoprene so that living isoprene-styrene anions were obtained.

In stage 2, 222.6 ml of purified, dry 1,3-butadiene were pressured into the reactor at a rate such that the reaction temperature did not exceed 60° C. After one hour, the reactor pressure had returned to its initial level and the formation of the second block of the diblock copolymer anions was complete.

In stage 3, any of varying amounts of the 78% mixture of para- and ortho-isomers of DVB was injected into the reactor to allow the formation of the star polymer, as shown in Table 3 (Sample Nos. 15–21), with the different amounts of DVB resulting in different DVB/anion molar ratios for the coupling studies. After 2.5 hours at 50° C, diacetone alcohol was injected into the reactor to quench the star living anion. The color of the reaction mixture changed from a dark amber to colorless immediately. The mixture was cooled to room temperature and filtered through alumina/Celite. An antioxidant Irganox 1076 from Ciba-Geigy (100 ppm based on dry polymer) was added and solvent was removed under reduced pressure to yield a star polymer as a clear, colorless, viscous fluid.

The values of DVB/polymer anion molar ratio, $M_n$ before and after coupling and the number of arms in the polymer obtained are shown in Table 3. The results indicate that at a DVB/anion molar ratio of 6/1 or above, the number of arms tends to remain constant while at molar ratios below 6 down to 0.75, the number of arms tends to decrease as the molar ratio decreases. The results of samples 16 and 17 also show that at constant coupling time and temperature and a DVB/anion molar ratio of 6/1, the presence of styrene does not appreciably affect the number of arms obtained.

TABLE 3

| Sample No. | DVB/Anion, Molar Ratio | $M_n$ Before Coupling | $M_n$ After Coupling | No. of Arms |
|---|---|---|---|---|
| 15 | 12 | 35,200 | 734,000 | 21 |
| 16 | 6 (no styrene) | 36,100 | 751,000 | 21 |
| 17 | 6 (with styrene) | 25,999 | 527,000 | 20 |
| 18 | 4.5 | 32,800 | 499,999 | 15 |
| 19 | 3 | 39,200 | 523,000 | 13 |
| 20 | 1.5 | 44,200 | 527,000 | 12 |
| 21 | 0.75 | 31,200 | 283,000 | 9 |

EXAMPLE IV

This example illustrates the preparation of star-shaped polymers wherein the arms are diblocks each of which has an isoprene-styrene copolymer block (A block) at its free end and a poly-1,3-butadiene block (B block) at its interior such that the star polymer contains 8 wt. % of polyisoprene, 11 wt. % of polystyrene, and 81 wt. % of poly-1,3,-butadiene. The example further illustrates the effect of arm molecular weight on the number of arms formed under fixed stage 3 reaction conditions (6/1 molar ratio of DVB/living anions and coupling at 50° C. for 4 hours).

In stage 1, the same procedure was followed as described previously for sample 17 of Example III, except that the quantity of cyclohexane introduced into the reactor was 2,268 ml., the amount of 1.6 M butyllithium injected to initiate polymerization was varied to obtain separate samples with varying values for the $M_n$ of the isoprene-styrene copolymer anions and subsequently for the arms of the star polymer as shown in Table 4, and the stage 1 polymerization time was 2.5 hours rather than 110 min. at 50° C.

In stage 2, the same procedure was followed as described previously for stage 2 of Example III with the different copolymer anions obtained in stage 1 to obtain separate samples of diblock anions in which the block at the nonliving end is an isoprene-styrene copolymer and the block at the living end is a polybutadiene, such diblock anions having values of $M_n$ as shown in the "Before Coupling" column of Table 4.

In stage 3, the same procedure was followed for each sample of stage 2 as previously described for stage 3 of Example III, using a constant DVB/anion molar ratio of 6/1, except that a five gallon reactor was employed and the coupling time was 4 hours rather than 2.5 hours at 50° C. The values of $M_n$ before and after coupling and the number of arms of the resulting star-shaped polymers are shown in Table 4. Such results indicate that lower arm $M_n$ caused easier star formation, i.e., a greater number of arms, apparently because of less steric hindrance during coupling of the diblock anions.

TABLE 4

| Sample No. | $M_n$ Before Coupling | $M_n$ After Coupling | No. of Arms |
|---|---|---|---|
| 22 | 52,000 | 1,240,000 | 24 |
| 23 | 64,500 | 1,160,000 | 18 |
| 24 | 71,100 | 985,000 | 14 |
| 25 | 74,800 | 840,000 | 11 |

EXAMPLE V

These examples illustrate the preparation of hydrogenation catalysts containing nickel and cobalt respectively, used in the selective hydrogenation of the samples of Example VI described hereinafter.

Catalyst A

In a clean dry pressure bottle equipped with a magnetic stir bar, were placed 77.9 of pure dry cyclohexane and 7.34 g. of nickel (II) octoate (8% in mineral spirits, Mooney Chemical). The bottle was sealed with a septum and bottle cap, evacuated and refilled with dry nitrogen. The process was repeated several times. The mixture was then stirred vigorously and 14.4 ml of 1.73 M triethylaluminum solution were added via syringe as quickly as practicable (about 15 seconds). Periodically, pressure was vented by means of a needle fitted with a valve. There was no evidence of heterogeneity in the final black reaction mixture. The catalyst solution nickel concentration was 0.1 M and the molar ratio of aluminum to nickel was 2.5/1.

Catalyst B

To 108 ml of a cobalt (II) octoate solution (12% cobalt) were added 1,611 ml of cyclohexane in an appropriate stirred vessel. To this solution were added 481 ml of 1.6 molar $Et_2AlOet$ solution over 60 minutes. Reaction of this compound with cobalt octoate was slow and no exotherm or immediate color change was observed. This mixture was stirred overnight before a color change occurred and acceptable catalyst was ready for use. The total volume of the reaction mixture was 2,200 ml, the catalyst solution cobalt concentration was 0.1 M and the molar ratio of aluminum to cobalt was 3.5.

EXAMPLE VI

This example illustrates the selective hydrogenation of the interior polybutadiene blocks (B or D blocks) of certain unhydrogenated star-shaped polymer samples described in Example III and identified in Tables 5 and 6 shown hereinafter.

A solution of 1,134 ml of cyclohexane and 70.6 g. of each of the unhydrogenated star-shaped polymer samples of Example III being tested was purged of air by evacuation followed by introduction of dry nitrogen. To the polymer solution were added 25.53 ml of a hydrogenation Catalyst A solution described in Example V and comprised of triethylaluminum and nickel octoate in a 2.75/1 ratio, with a nickel concentration of 0.1 M in cyclohexane. The resulting mixture was placed in a Parr hydrogenation apparatus and pressured to 50 psig hydrogen. The apparatus was vented and the process repeated twice more, after which time the pressure was maintained at 50 psig hydrogen. The temperature was raised to 50° C. and the mixture was agitated vigorously. Hydrogen was fed on demand in order to maintain 50 psig in the vessel, and the flow rate was monitored by means of a flow meter. The progress of the hydrogenation was monitored both by Fourier-Transformer infra-red spectroscopy (FTIR) and hydrogen flow rate. An IR spectrum obtained at the start of the reaction displayed the presence of initial unsaturation (peaks at 995, 968, 910 and 888 $cm^{-1}$). After 30 minutes, butadiene 1,2-vinyl unsaturation (peaks at 995, 910 $cm^{-1}$) was gone, the trans-1,4-butadiene was significantly reduced (968 $cm^{-1}$) and the isoprene unsaturation of 3,4-vinyl (888 $cm^{-1}$) remained. The final point corresponds to zero hydrogen flow. Upon completion of the selective hydrogenation process, the vessel was vented and the black reaction mixture was stirred in air with ammonium hydroxide and methanol stoichiometrically. Within several hours, the mixture had changed to a dark green color indicative of oxidized nickel. The mixture was filtered through alumina/Celite, and an anti-oxidant was added in the amount equivalent to 100 ppm based on the dry polymer weight. Solvent was then removed under reduced pressure to yield the product as a clear, colorless, viscous fluid.

In the foregoing example, Catalyst B comprising cobalt (II) octoate, described previously, is substituted for Catalyst A and similar hydrogenation results are obtained.

EXAMPLE VII

This example illustrates the low temperature vulcanization (cure) with sulfur of selectively hydrogenated star-shaped block polymers under this invention both in the absence of carbon black, i.e., the "gum cure" of such polymers, and in the presence of carbon black, i.e., the "carbon black cure". As an illustration of a gum cure of the polymers, 40 grams (100 phr, parts per hundred parts of rubber) of each of the selectively hydrogenated polymer samples prepared as described in Examples III and VI, together with 2.0 grams (5 phr) of zinc oxide, 0.4 gram (1 phr) of stearic acid, 0.4 gram (1 phr) of "Irganox 1076" antioxidant from Ciba-Geigy (octadecyl-3,5-di-tert-butyl-4-hydroxyhydrocinnamate), 0.32 gram (0.8 phr) of sulfur, and as curing accelerators, 0.32 gram (0.8 phr) of "Tetrone A" from Du Pont (dipentamethylenethiuram hexasulfide), 0.32 gram (0.8 phr) of "Ethyl Tellurac" from Vanderbilt (tellurium diethyldithiocarbamate), 0.32 gram (0.8 phr) of "TMBT" from Vanderbilt (tetramethylthiuram disulfide), and 0.4 gram (1.0 phr) of "MBT" from Vanderbilt (2-mercaptobenzothiazole), were mixed thoroughly in a Brabender mixer to a uniform consistency. The resulting paste was placed in a Teflon mold with dimensions of 3"×3"×0.25" and cured in a Carver press for one hour at 150° C. and 6000 psi pressure. Subsequently, the sample was removed from the mold and allowed to age overnight before any testing. The resulting solid rubber was non-tacky and elastic. Table 5 shows tensile strengths and elongations of the foregoing gum cure rubber compositions each containing a polymer sample of varying DVB/anion molar ratio and $M_n$ before and after coupling, prepared as described in Example III and identified by sample number in Table 3, and selectively hydrogenated as described in Example VI. The tensile strengths and elongations were measured before any aging at an elevated temperature and after aging in air at 150° C. for 3 and 7 days. The results of Table 5 indicate that rubbers can be compounded from the polymers of this invention which have excellent properties even after exposure to elevated temperatures for extended periods.

TABLE 5

| Sample No. | DVB/ Anion Molar Ratio | $M_n$ | No. of Arms | Aging @ 150° C. Days | Tensile Str., psi | Elongation % |
|---|---|---|---|---|---|---|
| 15 | 12/1 | 734,000 | 21 | none | 573 | 731 |
|  |  |  |  | 3 | 525 | 711 |
|  |  |  |  | 7 | 615 | 578 |
| 16 | 6/1 | 751,000 | 21 | none | 309 | 452 |
|  |  |  |  | 3 | 345 | 620 |
|  |  |  |  | 7 | 513 | 607 |
| 19 | 3/1 | 523,000 | 13 | none | 257 | 375 |
|  |  |  |  | 3 | 323 | 691 |
|  |  |  |  | 7 | 392 | 618 |
| 20 | 1.5/1 | 527,000 | 12 | none | 262 | 432 |
|  |  |  |  | 3 | 324 | 792 |
|  |  |  |  | 7 | 339 | 647 |

To illustrate the effect of a carbon black sulfur cure of rubber compositions comprising a selectively hydrogenated polymer of this invention, compositions were formulated as described previously for the preparation of gum cure compositions using various polymer samples prepared as described in Examples III and VI, except that each composition contained 34 grams (100 phr) of the selectively hydrogenated polymer which is 85% of the 40 grams utilized in the gum cure compositions, each additive was used in an amount of 85% of that in the gum cure composition. In this manner, the phr values for the additives remained the same as in the gum cure compositions. In addition, 17 grams (50 phr) of carbon black were also incorporated into each mix. The identification by sample number and characteristics of the polymer in each composition, the tensile strength and elongation of each composition before and after air aging at an elevated temperature, as well as in ozone at 40° C. are shown in Table 6. The results indicate that carbon black cured compositions containing the selectively hydrogenated polymers of this invention have excellent mechanical properties which are not substantially deteriorated after prolonged exposure to air or ozone at an elevated temperature.

TABLE 6

| Sample No. | DVB/ Anion, Molar Ratio | $M_n$ | No. of Arms | Aging* 7 Days at Elev. Temp. | Tensile Str., psi | Elongation % |
|---|---|---|---|---|---|---|
| 16 | 6/1 | 751,000 | 21 | unaged | 1,805 | 625 |
|  |  |  |  | air (150°) | 1,769 | 409 |
|  |  |  |  | ozone (40°) | 1,965 | 715 |
| 17 | 6/1 w/11% styrene | 527,000 | 20 | unaged | 2,289 | 442 |
|  |  |  |  | air (150°) | 1,686 | 369 |
|  |  |  |  | ozone (40°) | 1,752 | 638 |
| 19 | 3/1 | 523,000 | 13 | unaged | 1,737 | 606 |
|  |  |  |  | air (150°) | 1,709 | 446 |
|  |  |  |  | ozone (40°) | 1,818 | 631 |

TABLE 6-continued

| Sample No. | DVB/ Anion, Molar Ratio | $M_n$ | No. of Arms | Aging* 7 Days at Elev. Temp. | Tensile Str., psi | Elongation % |
|---|---|---|---|---|---|---|

*Air aging - no sample extension
Ozone aging - with 20% sample extension

We claim:

1. A maleic modified solid star-branched block copolymer wherein each branch comprises at least two (2) alternating blocks bonded to each other, the free end of each branch being a block of at least one polymerized hydrocarbon conjugated diene (I) monomer containing at least five (5) carbon atoms, with at least one carbon atom of each pair of residual double-bonded carbon atoms of polymerized diene (I) units being additionally single-bonded to two carbon atoms, or a copolymer of at least one diene (I) and at least one aryl-substituted olefin, the blocks adjacent to said polymerized diene (I)-containing blocks constituting about 50 to about 99.9 wt. % of said copolymer and being a polymer of at least one hydrocarbon conjugated diene (B), which is different from diene (I) and contains at least four (4) carbon atoms, with each residual double-bonded carbon atom of polymerized diene (13) units being additionally bonded to a hydrogen atom, wherein polymerized diene (B)containing blocks contain at least about 25 wt. % of 1,2-units if they are a polymer of predominantly 1,3-butadiene, and said star-branched block copolymer is selectively hydrogenated so that the ethylenic unsaturation in said polymerized conjugated diene (B) units is substantially completely hydrogenated, while said polymerized conjugated diene (I) units retain sufficient amount of their ethylenic unsaturation for subsequent chemical modification of said copolymer, and reacted after hydrogenation with maleic anhydride.

2. The copolymer of claim 1 wherein, after the hydrogenation reaction, the Iodine Number of the (I) polymer or copolymer blocks is about 10 to about 100% of the Iodine Number prior to the hydrogenation reaction.

3. The copolymer of claim 1 wherein, after the hydrogenation reaction, the Iodine Number of the (B) polymer blocks is about 0 to about 10% of the Iodine Number prior to the hydrogenation reaction.

4. The copolymer of claim 1 wherein diene (I) is isoprene, 2,3-dimethyl-butadiene, 2-methyl-1,3-pentadiene, myrcene, 2-methyl-1,3-pentadiene, 3-methyl-1,3-pentadiene, 4-methyl-1,3-pentadiene, 2-phenyl-1,3-butadiene, 2-phenyl-1 ,3-pentadiene, 3-phenyl-1,3-pentadiene, 2,3-dimethyl-1,3-pentadiene, 4-methyl-1,3-pentadiene, 2-hexyl-1,3-butadiene, 3-methyl-1,3-hexadiene, 2-benzyl-1,3-butadiene, 2-p-tolyl-1,3-butadiene or mixtures thereof.

5. The copolymer of claim 1 wherein diene (B) is 1,3-butadiene, 1,3-pentadiene, 2,4-hexadiene, 1,3-hexadiene, 1,3-heptadiene, 2,4-heptadiene, 1,3-octadiene, 2,4-octadiene, 3,5-octadiene, 1,3-nonadiene, 2,4-nonadiene, 3,5-nonadiene, 1,3-decadiene, 2,4-decadiene, 3,5-decadiene or mixtures thereof.

6. A maleic modified solid star-branched block copolymer in which each branch comprises at least two alternating blocks:

I-B wherein the free end is an I block which is a polymer comprising at least one polymerized conjugated diene having at least five (5) carbon atoms and the following formula

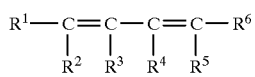

(1)

wherein $R^1$–$R^6$ are each hydrogen or a hydrocarbyl group, provided that at least one of the $R^1$–$R^6$ is a hydrocarbyl group, and further provided that the structure of the residual double bond in the polymerized I block has the following formula

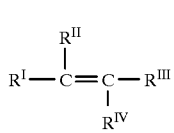

(2)

wherein $R^I$, $R^{II}$, $R^{III}$ and $R^{IV}$ are each hydrogen or a hydrocarbyl group, provided that either both $R^I$ and $R^{II}$ are hydrocarbyl groups or both $R^{III}$ and $R^{IV}$ are hydrocarbyl groups;

and the B block is an interior block which a polymer of at least one polymerized conjugated diene, different from the polymerized diene of the I block, having at least four (4) carbon atoms and the following formula

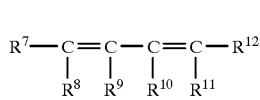

(3)

wherein $R^7$–$R^{12}$ are each hydrogen or a hydrocarbyl group, provided that the structure of the residual double bond in the polymerized B block has the following formula

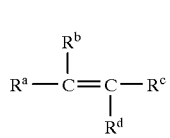

(4)

wherein $R^a$, $R^b$, $R^c$ and $R^d$ are each hydrogen (H) or a hydrocarbyl group, provided that one of $R^a$ or $R^b$ is hydrogen, one of $R^c$ or $R^d$ is hydrogen and at least one of $R^a$, $R^b$, $R^c$ or $R^d$ is a hydrocarbyl group, said B blocks constituting about 50 to about 99.9 wt. % of said copolymer, wherein said B block contains at least about 25 wt. % of 1,2-units if it is a polymer of predominantly 1,3-butadiene, and said star-branched block copolymer is selectively hydrogenated so that the ethylenic unsaturation in each of the B blocks is substantially completely hydrogenated, while each of the I blocks retains a sufficient amount of its original ethylenic unsaturation for chemical modification of said copolymer, and reacted after hydrogenation with maleic anhydride.

7. A maleic modified solid star-branched block copolymer in which each branch comprises at least two alternating blocks:

A-D wherein the free end is an A block which is a polymer comprising at least one aryl-substituted olefin and at least one conjugated diene having at least five (5) carbon atoms and the following formula

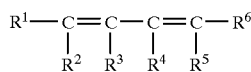 (1)

wherein $R^1$–$R^6$ are each hydrogen or a hydrocarbyl group, provided that at least one of the $R^1$–$R^6$ is a hydrocarbyl group, and further provided that the structure of the residual double bond in the I block has the following formula

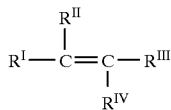 (2)

wherein $R^I$, $R^{II}$, $R^{III}$ and $R^{IV}$ are each hydrogen or a hydrocarbyl group, provided that either both $R^I$ and $R^{II}$ are hydrocarbyl groups or both $R^{III}$ and $R^{IV}$ are hydrocarbyl groups;
and the D block is an interior block which is a polymer of at least one polymerized conjugated diene, different from the polymerized diene of the A block, having at least four (4) carbon atoms and the following formula.

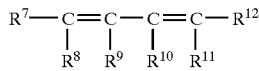 (3)

wherein $R^7$–$R^{12}$ are each hydrogen or a hydrocarbyl group, provided that the structure of the residual double bond in the B block has the following formula

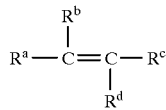 (4)

wherein $R^a$, $R^b$, $R^c$ and $R^d$ are each hydrogen (H) or a hydrocarbyl group, provided that one of $R^a$ or $R^b$ is hydrogen, one of $R^c$ or $R^d$ is hydrogen and at least one of $R^a$, $R^b$, $R^c$ or $R^d$ is a hydrocarbyl group, said D blocks constituting about 50 to about 99.9 wt. % of said copolymer, wherein said D block contains at least about 25 wt. % of 1,2-units if it is a polymer of predominantly 1,3-butadiene, and said star-branched block copolymer is selectively hydrogenated so that the ethylenic unsaturation in each of the D blocks is substantially completely hydrogenated, while each of the A blocks retains a sufficient amount of its original ethylenic unsaturation for chemical modification of said copolymer, and reacted after hydrogenation.

8. A maleic modified solid star-branched block copolymer in which each branch comprises at least three alternating blocks:

I-D-A wherein the free end is either the I or the A block, and the I block is a polymer of at least one conjugated diene having at least five (5) carbon atoms and the following formula

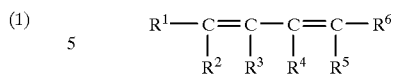 (1)

wherein $R^1$–$R^6$ are each hydrogen or a hydrocarbyl group, provided that at least one of the $R^1$–$R^6$ is a hydrocarbyl group, and further provided that the structure of the residual double bond in the I block has the following formula

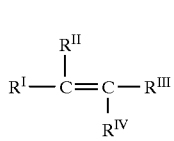 (2)

wherein $R^I$, $R^{II}$, $R^{III}$ and $R^{IV}$ are each hydrogen or a hydrocarbyl group, provided that either both $R^I$ and $R^{II}$ are hydrocarbyl groups or both $R^{III}$ and $R^{IV}$ are hydrocarbyl groups;
the D block is an interior block which is a polymer of at least one polymerized conjugated diene, different from the polymerized diene of the I block, having at least four (4) carbon atoms and the following formula

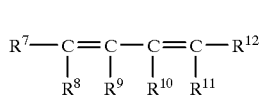 (3)

wherein $R^7$–$R^{12}$ are each hydrogen or a hydrocarbyl group, provided that the structure of the residual double bond in the B block has the following formula

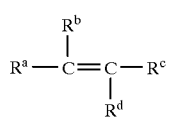 (4)

wherein $R^a$, $R^b$, $R^c$ and $R^d$ are each hydrogen (H) or a hydrocarbyl group, provided that one of $R^a$ or $R^b$ is hydrogen, one of $R^c$ or $R^d$ is hydrogen and at least one of $R^a$, $R^b$, $R^c$ or $R^d$ is a hydrocarbyl group;
and the A block is a copolymer of at least one aryl-substituted olefin and at least one conjugated diene having at least five (5) carbon atoms and the following formula

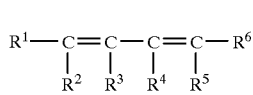 (1)

wherein $R^1$–$R^6$ are each hydrogen or a hydrocarbyl group, provided that at least one of $R^1$–$R^6$ is a hydrocarbyl group, and further provided that the structure of the residual double bond in the A block has the following formula

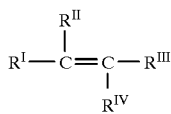

(2)

wherein $R^I$, $R^{II}$, $R^{III}$ and $R^{IV}$ are each hydrogen or a hydrocarbyl group, provided that one of $R^I$ or $R^{II}$ are hydrocarbyl groups or both $R^I$ or $R^{II}$ are hydrocarbyl groups, said D blocks constituting about 50 to about 99.9 wt. % of said copolymer, wherein said D block contains at least about 25 wt. % of 1,2-units if it is a polymer of predominantly 1,3-butadiene, and said star-branched block copolymer is selectively hydrogenated, so that the ethylenic unsaturation in each of the D blocks is substantially completely hydrogenated, while each of the I and A blocks retains a sufficient amount of its original ethylenic unsaturation for chemical modification of said copolymer, and reacted after hydrogenation with maleic anhydride.

* * * * *